US005342542A

United States Patent [19]

Burzio et al.

[11] Patent Number: 5,342,542

[45] Date of Patent: Aug. 30, 1994

[54] PROCESS FOR INCREASING THE BLEACHING EFFICIENCY OF PERSALTS BY USING A PARTIALLY ACETYLATED SUCROSE AS A BLEACH ACTIVATOR

[75] Inventors: Fulvio Burzio, Milan, Italy; Roland Beck, Vilvoorde, Belgium; Julio Mentech, Villeurbanne, France

[73] Assignee: Ausimont S.p.A., Milan, Italy

[21] Appl. No.: 814,109

[22] Filed: Dec. 26, 1991

[30] Foreign Application Priority Data

Dec. 28, 1990 [EP] European Pat. Off. ........ 90125749.3

[51] Int. Cl.[5] ........ C01B 3/00

[52] U.S. Cl. ........ 252/186.39; 252/186.38; 252/95

[58] Field of Search ........ 252/186.39, 186.38

[56] References Cited

U.S. PATENT DOCUMENTS

| | | | |
|---|---|---|---|
| 2,955,905 | 10/1960 | Davies et al. | 8/111 |
| 3,901,819 | 8/1975 | Nakagawa et al. | 252/186.38 |
| 4,486,327 | 12/1984 | Murphy et al. | 252/186.38 |
| 4,539,130 | 9/1985 | Thompson et al. | 252/186.38 |
| 4,800,038 | 1/1989 | Broze et al. | 252/186.38 |

FOREIGN PATENT DOCUMENTS

| | | |
|---|---|---|
| 0150532 | 8/1985 | European Pat. Off. . |
| 1246658 | 8/1967 | Fed. Rep. of Germany . |

*Primary Examiner*—Robert L. Stoll
*Assistant Examiner*—Joseph D. Anthony
*Attorney, Agent, or Firm*—Elizabeth M. Barnhard; Bryan Cave

[57] ABSTRACT

Described is a process for increasing the bleaching efficiency of an inorganic persalt (peroxide) by adding to said persalt (peroxide) an activating agent comprising acetylated sucrose, the average acetylation degree of said acetylated sucrose being from 4.5 to 7.0.

8 Claims, 2 Drawing Sheets

PROCESS FOR INCREASING THE BLEACHING EFFICIENCY OF PERSALTS BY USING A PARTIALLY ACETYLATED SUCROSE AS A BLEACH ACTIVATOR

The present invention relates to a process for increasing the bleaching efficiency of an inorganic persalt (peroxide) with respect to textiles or other products like paper, cellulose cork, hair etc. Although the following description refers to sodium perborate only, the present invention can equally be applied to other inorganic persalts (or peroxides) normally used in the field of bleaching and of detergency, for instance hydrogen peroxide and the alkalimetal percarbonates, persilicates, per-pyrophosphates etc. Preferred alkali metals are Na, K and Li, particularly Na.

When an inorganic persalt (peroxide) is used alone, at a temperature equal to or higher than 80° C., a very high activity may be observed. At a lower temperature, however, for instance 40° C., in the absence of activating agents, the persalt (peroxide) efficiency falls to a very low level, thus jeopardizing the bleaching results (under the usual bath conditions). One class of traditional activating agents is represented by the completely acetylated sugars such as, e.g., penta-acetyl-glucose and octa-acetyl-sucrose. DE-A-1 246 658 teaches that also the partially acetylated sugars can be used, e.g., a disaccharide having three or more acetyl groups in the molecule.

It has now surprisingly been found that disaccharides with different degrees of acetylation show a sharply differing behavior and that there are compounds which show a particularly high activity.

Figure 1:
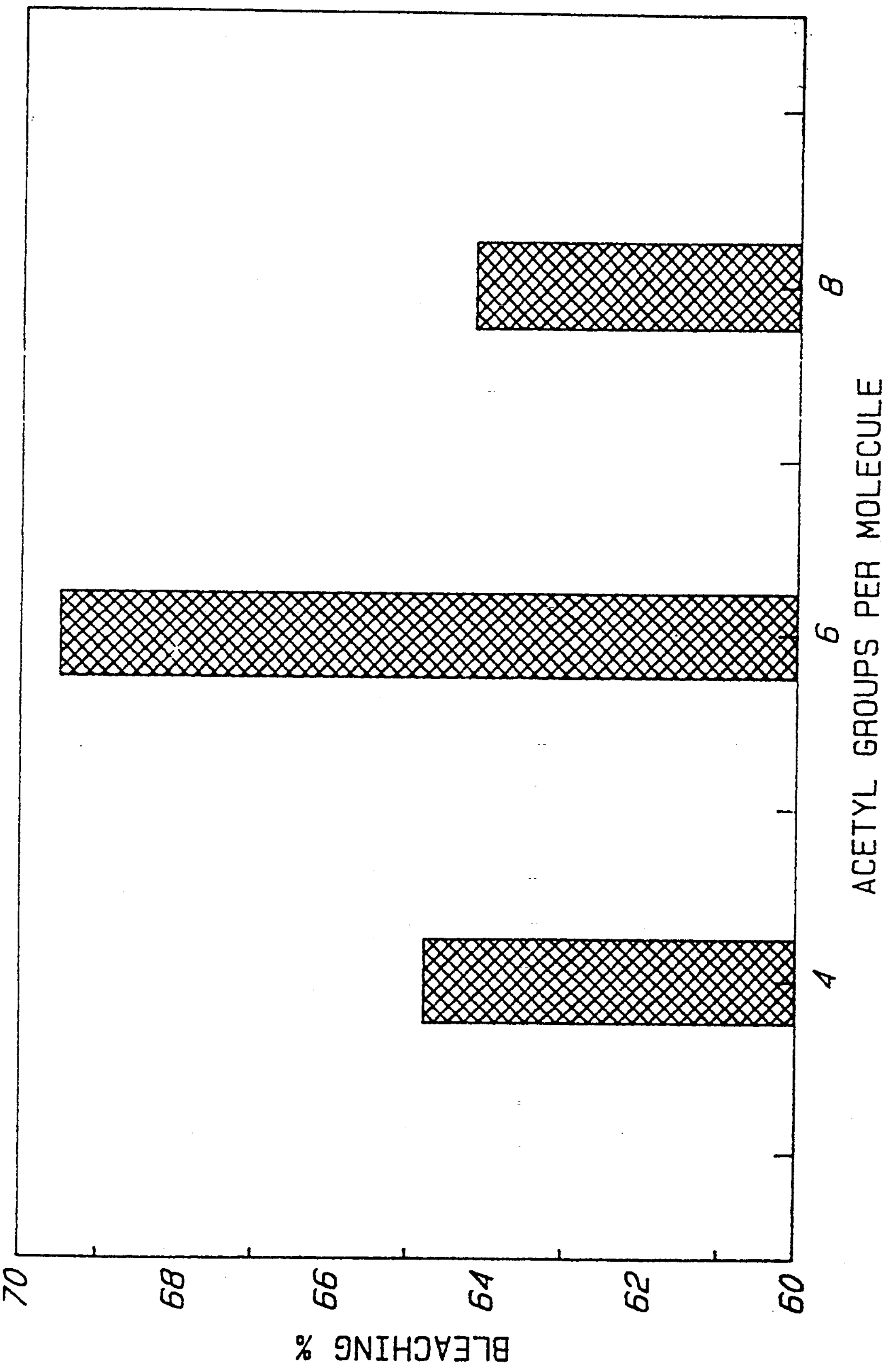
FIG. 1 is a graph comparing bleaching efficiency of acetylated sucroses having different numbers of acetyl groups.

In its broadest aspect the present invention relates to a process for increasing the bleaching efficiency of an inorganic persalt (or peroxide), in particular sodium perborate mono-or tetra-hydrate, by adding to said persalt (peroxide) an activating agent comprising acetylated sucrose, the average acetylation degree of said acetylated sucrose ranging from 4.5 to 7.0, preferably from 5.5 to 6.5.

The partially acetylated sucrose employed according to the present invention, hereinafter also referred to as "SUPA", may be prepared by deacetylation of octa-acetyl sucrose or of a sucrose having an average acetylation degree higher than 7; alternatively, one can directly acetylate sucrose or a sucrose having an average acetylation degree lower than 4.5.

For the latter purpose (direct acetylation) one can use, as acetylating agent, acetic acid, acetic anhydride, acetyl chloride or ketene, preferably in the presence of an organic solvent, and/or a catalyst and/or an azeotropic agent (for instance benzene or isobutyl acetate); a stoichiometric excess and the temperature are the most important parameters for controlling the acetylation degree.

The de-acetylation, on the other hand, can be carried out, e.g., by transesterification with a $CH_3ONa/CH_3OH$ mixture, by catalytic deacetylation (hydrolysis) on alumina, by saponification (with caustic soda), by enzymatic methods or by a combination thereof. The de-acetylation (or acetylation) product actually is a mixture of compounds having different degrees of acetylation and even if the acetylation degree is the same, such compounds are, in turn, mixtures of isomers. Should a very narrow distribution be required, the reaction temperature and the ratios of the reactants must be controlled very carefully. A selective liquid-liquid extraction can provide a deep depuration of the product and an extremely narrow distribution around the prefixed (predetermined) acetylation degree. The average acetylation degree may be determined in several ways, for instance by $^1$H-NMR analysis or by titration after saponification; the results of the different methods usually show a deviation of 1 to 2 units in the first decimal.

The SUPA employed according to the present invention shows, in contrast to other partially or completely acetylated sugars, a bleaching efficiency equal to or higher than that of the best activating agent ever known, namely TAED (tetraacetyl ethylene diamine), the preparation of said TAED being rather complicated. As compared to TAED, SUPA also shows the advantage of being recoverable from natural, hence renewable, sources and not from compounds directly or indirectly derived from oil. Aiming at a better protection of the environment, all this is likely to reduce the ecological problems.

The higher the amount of SUPA (up to the stoichiometric ratio with respect to, e.g., perborate), the higher the bleaching efficiency of the activating agent added to the persalt (peroxide). Said feature, shared with TAED, makes the SUPA particularly suitable for satisfying the demand for continuously increasing amounts of activating agents present in the bleaching and/or detergent compositions, aiming at an always increasing bleaching effect.

SUPA may be directly added as such to a composition containing the persalt (peroxide) or it can be previously mixed with the persalt (peroxide) intended for the bleaching process. In the case of granular compositions, SUPA may be added in granular form, showing suitable mechanical features and a suitable granulometric index. Obviously, the bleaching and/or detergent compositions containing SUPA and persalt (peroxide) may also contain other usual components, like anionic, non-ionic or amphoteric surfactants, neutral salts (for instance sodium sulfate), alkali metal salts (for instance sodium carbonate or tripolyphosphate), zeolites, carboxymethyl cellulose, perfumes, enzymes etc. The molar ratio of acetylated sucrose to persalt (peroxide) usually is from 10:90 to 50:50. When the persalt (peroxide) is exploited at a low temperature and for a short period of time, the amount of SUPA should preferably be increased.

The following examples are provided for merely illustrative purpose and do not limit in any way the scope of the invention. The SUPA of example 1, hereinafter referred to as SUPAM6, having an average acetylation degree of 6.0 (+/−0.2), was prepared as follows (by de-acetylation):

1 kg of octaacetyl-sucrose, dissolved in 2.5 liters of toluene, was mixed, under stirring (at room temperature and for a few minutes), with a methanolic solution of sodium methoxide (concentration=1 g/liter). After neutralization on an ion exchange resin (AMBERLYST® I R 120 H+) the water-soluble acetylated sucroses were extracted by means of deionized water. The aqueous layer was concentrated under vacuum, resulting in a solid white foam. The organic layer, containing the compounds having the uppermost acetylation degree, was recycled, along with fresh octaacet, 1-sucrose, to a new synthesis cycle.

The solubility of the different kinds of SUPA in water was evaluated by dissolving 3.2 millimoles of SUPA in 250 ml of deionized water at 60° C., in the presence of 3.2 millimoles of sodium perborate tetrahydrate under magnetic stirring (250 rpm), and by measuring the time required for obtaining a clear solution. The dissolution times of the various products are recorded in the following tables.

EXAMPLE 1

An automatic washing machine (IGNIS) was made to run under the following conditions:

washing program at 60° C.;

linen load: 3 kg of cotton swatch (white and clean) per washing cycle;

6 g/washing cycle of SUPA-M6 were added, as given in Table 1, to the following detergent composition (which was also used in all the other examples):

| | |
|---|---|
| sodium perborate tetrahydrate: | 30 g/washing |
| detergent base (phosphorus-free, free of bleaching agents): | 114 g/washing. |

Said detergent base contained:

| | (%) (w/w) |
|---|---|
| overall surfactants (linear sodium dodecylbenzene sulphonate + soap + $C_{13}$–$C_{15}$ alcohol, ethoxylated with EO) | 15.4 |
| zeolite (4Å) | 28.6 |
| sodium silicate ($SiO_2/Na_2O$ = 2) | 4.4 |
| sodium carbonate | 16.5 |
| sodium sulfate | 26.5 |
| carboxymethyl cellulose | 1.2 |
| antiincrustation copolymers | 4.8 |
| optical bleaching agents | 0.3 |
| water up to | 100.0 |

For the determination of the bleaching efficiency (bleaching booster activity), the clean linen was washed together with 2 samples (swatches)/washing cycle, previously stained in a standard way, with red wine, by the European Institute of Sankt Gallen (EMPA 114). At the end of each washing cycle said 2 samples were dried and ironed; the whiteness degree was then measured by means of an Elrepho-Zeiss reflectometer. The resulting bleaching percentage (measure of the bleaching efficiency), given in Table 1, was determined by the formula:

$$\text{bleaching } (\%) = (A-B)/(C-B) \times 100$$

where:

A = whiteness degree of the swatch after the washing;

B = whiteness degree of the swatch before the washing;

C = whiteness degree of the swatch completely bleached.

The whiteness degree of the swatches is expressed as percentage of the whiteness degree of MgO, as standard, when measured with a filter No.6 (wave length = 464 nm). The thus obtained percentage (69.5%) is given in Table 1, along with the results of the other examples.

EXAMPLES 2 AND 3

Example 1 was repeated by respectively increasing the amount of activator (SUPA-M6) to 12and 18 g/washing cycle, as given in Table 1 which also shows the obtained results.

EXAMPLES 4 TO 6 (COMPARATIVE)

Examples 1 to 3 were repeated, replacing SUPA-M6 by an equal amount of completely acetylated sucrose (M8); the results, given in Table 1, clearly show that a complete acetylation of sucrose, contrary to the common knowledge (until now), results in a sharp decrease of the bleaching efficiency.

EXAMPLES 7 AND 8 (COMPARATIVE)

Example 1 was repeated, replacing SUPA-M6 by an equal amount of activators consisting of sucrose at different acetylation levels, also obtained by de-acetylation of octa-acetyl-sucrose; the results are shown in Table 2.

EXAMPLES 9 AND 10

Figure 2:
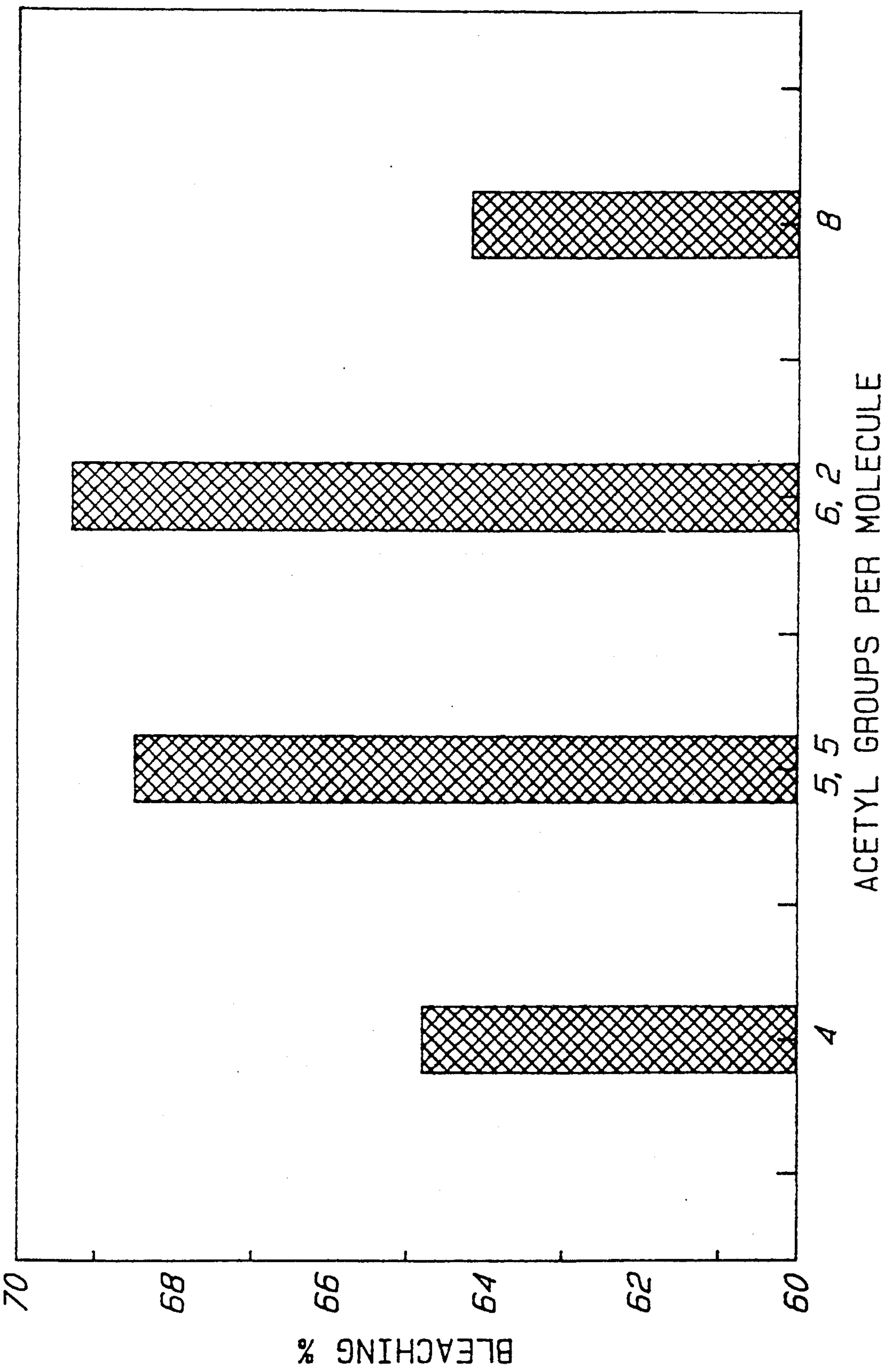
FIG. 2 is a graph comparing bleaching efficiency of acetylated sucroses having different numbers of acetyl groups.

Example 1 was repeated, replacing SUPA-M6 by an equal amount (6 g/washing cycle) of two kinds of partially acetylated sucrose, having respectively an average acetylation degree of 5.5 and 6.2, obtained by direct acetylation (at 0° C., for 6 hours and under stirring of a solution of sucrose (10 kg) in pyridine (150 liters))with acetic anhydride (16.5 liters), followed by neutralization and solvent evaporation under vacuum. Data and results are given in Table 3 and FIG. 2.

TABLE 1

| ACTIVATOR AMOUNT (g/washing cycle) | 6 | 12 | 18 |
|---|---|---|---|
| BLEACHING (%) OBTAINED WITH THE FOLLOWING ACTIVATORS | | | |
| SUPA-M6 (Examples 1–3) (dissolution time: 5 min.) | 69.5 | 72.7 | 76.0 |
| OCTAACETYL-SUCROSE (Examples 4–6)(*) (dissolution time: longer than 30 minutes) | 64.2 | 65.4 | 67.0 |

(*)comparative

TABLE 2

| EX. | ACTIVATOR | Bleaching (%) |
|---|---|---|
| 1 | SUPA-M6 | 69.5 |
| 7(*) | TETRAACETYL-SUCROSE (SUPA-M4) (dissolution time: 2 min.)(**) | 64.8 |
| 8(*) | NO ACTIVATOR ( blank; not activated perborate) | 54.9 |

(*)comparative
(**)Average acetylation degree = 4.0 (+/− 0.2)
Results are graphically represented = in FIG. 1.

TABLE 3

| EX. | ACTIVATOR | Bleaching (%) |
|---|---|---|
| 1 | SUPA-M6 | 69.5 |
| 9 | SUPA-M5.5 (dissolution time: 5 min.) | 68.5 |
| 10 | SUPA-M6.2 (dissolution time: 5 min.) | 69.3 |

We claim:

1. Process for increasing the bleaching efficiency of an inorganic persalt or peroxide by adding to said persalt (peroxide) an activating agent comprising acetylated sucrose, the average acetylation degree of said acetylated sucrose being from 4.5 to 7.0, wherein the molar ratio of acetylated sucrose to persalt (peroxide) is from 10:90 to 50:50.

2. Process according to claim 1, wherein the acetylated sucrose has been obtained by de-acetylation of octa-acetyl sucrose or of a partially acetylated sucrose having an average acetylation degree higher than 7.

3. Process according to claim 1, wherein the acetylated sucrose has been obtained by direct acetylation of sucrose or of a partially acetylated sucrose having an average acetylation degree lower than 4.5.

4. Process according to claim 1, wherein said acetylation degree is from 5.5 to 6.5.

5. Process according to claim 1, wherein the persalt is selected from the group consisting of sodium perborate mono-hydrate, sodium perborate tetrahydrate and mixtures thereof.

6. Process according to claim 1, wherein said persalt (peroxide) is contained in a bleaching or detergent composition, and the acetylated sucrose is added to the bleaching or detergent composition containing said persalt (peroxide).

7. Process according to claim 1, wherein the acetylated sucrose is employed in granular form.

8. Bleaching or detergent composition containing an inorganic persalt or peroxide and an activating agent comprising acetylated sucrose having an average degree of acetylation of from 4.5 to 7.0, wherein the molar ratio of acetylated sucrose to persalt (peroxide) is from 10:90 to 50:50.

* * * * *